United States Patent [19]

McCall

[11] 4,217,776

[45] Aug. 19, 1980

[54] ANCHOR PULLOUT TESTING APPARATUS AND METHODS

[75] Inventor: Richard H. McCall, Houston, Tex.

[73] Assignee: Texaco Inc., White Plains, N.Y.

[21] Appl. No.: 947,917

[22] Filed: Oct. 2, 1978

Related U.S. Application Data

[63] Continuation of Ser. No. 905,262, May 12, 1978, abandoned.

[51] Int. Cl.$^2$ .............................................. G01L 1/00
[52] U.S. Cl. ................................................. 73/141 R
[58] Field of Search .............. 73/141 R, 141 AB, 784, 73/803, 827, 84, 143; 116/DIG. 34

[56] References Cited

U.S. PATENT DOCUMENTS

| | | | |
|---|---|---|---|
| 629,290 | 7/1899 | Goodbaudy | 73/141 AB |
| 1,247,249 | 11/1917 | Felcyn | 73/141 AB |
| 3,033,495 | 5/1962 | Sikora | 73/141 AB |
| 3,036,459 | 5/1962 | Kendall | 73/141 AB |
| 3,738,163 | 6/1973 | McEntire | 73/141 R |
| 3,747,400 | 7/1973 | Finsterwalder | 73/768 |
| 3,942,368 | 3/1976 | Hoyt | 73/84 |

*Primary Examiner*—Anthony V. Ciarlante
*Attorney, Agent, or Firm*—Carl G. Ries; Thomas H. Whaley; Theron H. Nichols

[57] ABSTRACT

An apparatus for testing the minimum pullout strength of a ground anchor for an oil well derrick or other towers (as an antenna) guy line comprises an open ended cylinder connected to an anchor line, a piston positioned in the cylinder having a piston connecting rod extending out of the cylinder open end and connected to a winch, a compression spring around the connecting rod for damping outward movement of the piston from the cylinder, and a shear pin protruding through both the cylinder and the piston so that while applying an increasing load to the piston connecting rod, if the anchor does not move prior to breaking of the shear pin, a safe, satisfactory, and reliable anchor is indicated. A method for forming an anchor pullout test apparatus and a method for testing the pullout strength of an anchor are disclosed.

10 Claims, 3 Drawing Figures

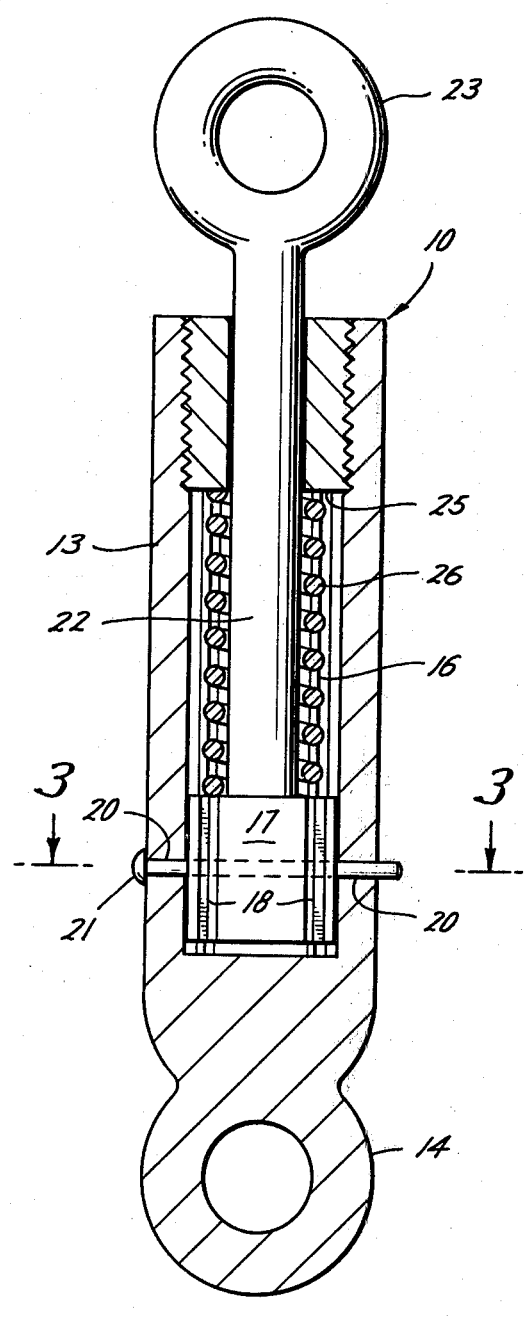
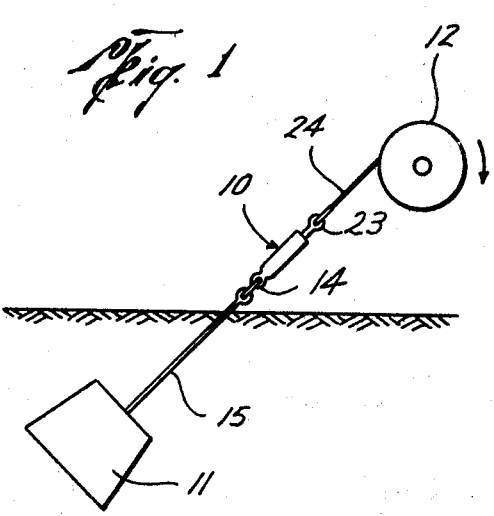
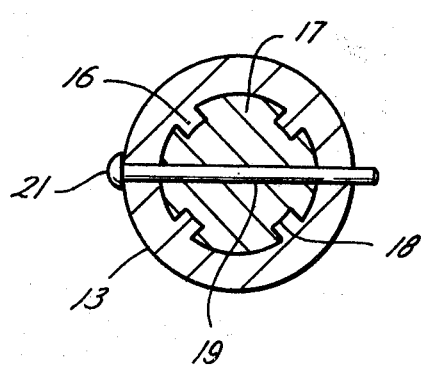

ANCHOR PULLOUT TESTING APPARATUS AND METHODS

This is a continuation, of application Ser. No. 905,262, filed May 12, 1978 now abandoned.

BACKGROUND OF THE INVENTION

Most State Occupational Safety Boards have enacted a safety standard which requires the testing of ground anchors which are used to hold guy lines supporting the derricks or masts of service rigs used in oil field work or other towers, as an antenna. In part, this standard, referring to the anchors, states: ". . . the owner or representative shall make representative pull tests for the area, and size and type of anchor involved using recognized testing methods . . . " Additionally, the standard furnishes the deadman test load which each anchor must support and the amount of load to be applied during testing.

Prior systems for testing anchors normally include a load measuring device which is hydraulically actuated and, in operation, is attached to the test line leading to the anchor. The load is applied to the line and increased to that specified in the safety manual. If the anchor resists this applied load it is considered to be satisfactorily tested.

OBJECTS OF THE INVENTION

A principal object of this invention is to provide a simple mechanically operated apparatus having only one moving part for testing anchors that uses no hydraulic fluid, no packing, no gauges, etc., that would require regular periodic maintenance to prevent leaks and inoperativeness.

Another object of this invention is to provide a simple method for forming an anchor testing pullout device, an easy method for testing the pullout strength of an anchor, and to provide a mechanism for testing the pullout strength of a ground anchor that is easy to operate, is of simple configuration, is economical to build and assemble, and is of greater efficiency for the testing of ground anchors, as for supporting the derricks or masts of service rigs used in oil field work or other towers.

Other objects and various advantages of the disclosed methods and apparatus for testing ground anchors will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form of the invention wherein like reference numerals designate corresponding parts in the several views in which:

FIG. 1 is a schematic diagrammatic view of a ground anchor testing device connected between the anchor and a load applying source, FIG. 2 is an enlarged plan view of the anchor testing apparatus per se, with parts in section; and FIG. 3 is a sectional view taken at 3—3 on FIG. 2.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTION

This invention comprises a method for testing the pullout strength of an anchor, a method for forming or assembling an anchor pullout test device, and a particular, simple, easy to operate anchor pullout testing apparatus.

METHOD FOR ASSEMBLING AN ANCHOR PULLOUT TEST MECHANISM

A method for assembling or forming a device for testing the minimum pullout strength of a ground anchor (11, FIG. 1), such as for use in holding a guy line (15, 24) for supporting a derrick or mast in service rigs used in oil field work or other towers, as an antenna, comprises the basic steps of, (1) forming an open ended cylinder (13, FIG. 2) with means (14) on the cylinder closed end for attaching to a line to the anchor, (2) inserting a piston (17, FIG. 2) in the closed end of the cylinder, (3) connecting one end of a piston connecting rod (22) to the piston with the other end of the piston rod extending from the cylinder open end, (4) forming an attachment means (23) to the piston connecting rod other end for attaching to a load applying source (12), (5) circumscribing the piston connecting rod with a compression spring (26) for damping movement of the piston, and (6) inserting a shear pin (21, FIG. 3) of a predetermined strength through the cylinder closed end and the piston so that while applying an increasing load on the piston connecting rod, if the anchor does not move prior to breaking of the shear pin, a safe, satisfactory, and reliable anchor is indicated.

In greater detail of the above method additional steps may be, (7) forming, as by machining, splines (16, FIG. 2) on the internal surface of the cylinder, (8) forming, as by machining, grooves (18) on the outer surface of the piston for mating with and sliding over the splines upon breaking of the shear pin, (9) reducing the internal diameter of the outer open end of the cylinder,

(10) fitting the compression spring around the piston rod between the cylinder reduced diameter portion (25) and the piston for damping the sudden outward extending movement of the piston when the shear pin breaks,

(11) forming shear pins of different materials for testing anchors of different pullout strengths, and

(12) reducing the diameter of the cylinder outer open end for forming stop means (25) for preventing complete separation of the piston from within the cylinder upon breaking of the shear pin.

THE PREFERRED EMBODIMENT FOR PRACTICING THE INVENTION

While various devices may be utilized for carrying out or practicing the inventive methods or made by the above methods, FIGS. 1 to 3 illustrate at least one inventive apparatus. The disclosed apparatus may be operated by other methods than those disclosed, as by hand. This is the preferred apparatus for performing the above methods or made by the above methods.

FIG. 1 is a schematic diagrammatic view of an anchor testing apparatus 10 in position between the anchor 11 and a load applying apparatus, such as but not limited to, a winch 12. Lines 15 and 24 connect the respective anchor and winch to the testing apparatus.

FIG. 2 is an enlarged view of the anchor testing apparatus 10 with parts in section. This apparatus comprises basically a piston and cylinder mechanism. A large cylinder 13 has a loop 14 formed on the closed end of the cylinder for attaching the line 15, FIG. 1, from the anchor 11.

The cylinder 13, FIG. 2, having splines 16 internally thereof, receives a piston 17 slideable therein. The piston has grooves 18 for guiding the splines 16 so that a hole 19 in the piston aligns with holes 20 in cylinder 13 for the insertion of a shear pin or restraining means 21 of a predetermined shear strength.

This shear pin 21 may be formed at various and different materials or may be formed of different sizes for providing the predetermined loads at which the anchors are designed and tested to withstand.

An elongated headed means or piston connecting rod 22 is threaded into the piston 17. The connecting rod extends from the piston out through the cylinder open end to terminate in a line connecting means, such as but not limited to a loop 23. A line 24, FIG. 1, connects the piston connection rod through its loop connecting means 23 to the winch 12. The cylinder open end has a reduced diameter end portion 25, FIG. 2, the diameter of which portion is only slightly greater than that of the piston connecting rod 22 for free and easy sliding movement between the two.

A compression spring 26, FIG. 2, is mounted around the piston connecting rod 22 between the piston 17 and the cylinder reduced diameter end portion 25 for absorbing the shock when the shear pin breaks. While the cylinder reduced end portion 25 may be formed in various forms, preferably it is formed to screw into the open end of the cylinder 13.

Accordingly, an anchor pullout apparatus is disclosed for assuring that an anchor will resist a predetermined pullout force without testing the anchor to destruction.

METHOD FOR TESTING THE MINIMUM PULLOUT STRENGTH OF AN ANCHOR

A method for testing the minimum pullout strength of a ground anchor (11, FIG. 1), such as for use in holding a guy line for supporting a derrick or mast in service rigs used in oil field work or antenna, etc., comprises the basic steps of, (1) positioning a piston (17, FIG. 2) deep in an open ended cylinder (13), (2) protruding a shear pin (21) of a predetermined strength transversely through the cylinder and the piston, (3) connecting the cylinder to the anchor, (4) connecting a piston connecting rod (22) extending from the cylinder to a winch (12, FIG. 1), and (5) reeling in the winch until the shear pin breaks so that while applying an increasing load on the piston connecting rod, if the anchor does not move prior to breaking of the shear pin, a safe, satisfactory, and reliable anchor is indicated.

More detailed steps of the above method include the following:

(6) attaching a line (15, FIG. 1) from the anchor to an attaching device on the cylinder closed end, (7) attaching a line (24) from the winch (12) to a fastening attachment (23, FIG. 2) on the outer end of the piston connecting rod, and (8) damping outward movement of the piston from the cylinder with a compression spring (26) encircling the piston connecting rod between an enlarged portion on the cylinder outer open end and the piston for preventing flopping of the lines due to the sudden outward movement of the elongated headed means or piston connecting rod (22) causing sudden slackness therein resulting from breaking of the shear pin.

Accordingly, it will be seen that a method for assembling or forming an anchor pullout test mechanism, a method for testing the minimum pullout strength of an anchor, and an apparatus for testing the strength of a ground anchor will operate in a manner which meets each of the objects set forth hereinbefore.

While only one method for forming the test apparatus, one method for testing pullout strength of an anchor, and one mechanism of the invention have been disclosed, it will be evident that various other methods and modifications are possible without departing from the scope of the invention and it is accordingly desired to comprehend within the purview of this invention such modifications as may be considered to fall within the scope of the appended claims.

I claim:

1. An apparatus for testing the minimum pullout strength of a ground anchor for an oil well derrick guy line positioned between a line to the anchor and a line to a power source comprising,
    (a) an open ended cylinder with means on the closed end for connecting to the anchor line,
    (b) a piston positioned in the closed end of the cylinder having a piston connecting rod extending out of the cylinder open end with means for connecting to the power source,
    (c) shear pin means that will break at a predetermined applied force inserted through said cylinder closed end and through said piston, and
    (d) spring means for the cylinder for damping extending movement of the piston when said shear pin breaks for preventing flopping of the lines due to breaking of said shear pin resulting in the sudden slackness therein so that while applying an increasing load on the piston connecting rod, if the anchor does not move prior to breaking of the shear pin, a safe, satisfactory, and reliable anchor is indicated.

2. A testing apparatus as recited in claim 1 wherein,
    (a) said spring means comprises a compression spring positioned around said piston connecting rod between a reduced diameter end portion of the cylinder outer open end and said piston for damping the sudden outward extending movement of the piston when the shear pin breaks.

3. A testing apparatus as recited in claim 1 wherein, (a) said cylinder has splines formed in the internal surface thereof, and
(b) said piston has grooves for sliding on said splines for aligning the piston with the cylinder for insertion of said shear pin means.

4. A testing apparatus as recited in claim 1 wherein,
(a) said cylinder has stop means for preventing complete separation of said piston from within said cylinder upon breaking of said shear pin.

5. A testing apparatus as recited in claim 1 wherein,
(a) said shear pin is formed of different materials for testing anchors of different pullout loads for breaking at said different loads.

6. An apparatus for testing the minimum strength of a guy line positioned between a first point means and a second point means, the second point means having means for placing the guy line in a predetermined tension, comprising,
(a) housing means having one end connecting to the first point means,
(b) elongated means having a head thereon positioned in said housing means and connected to the second point means,
(c) shear means for indicating a predetermined tension in the guy line by shearing at the predetermined tension as it restrains said elongated means in said housing means when the guy line is placed in tension by the second point means, and
(d) spring means for said housing means for damping extending movement of said elongated means when said shear means shears as it is pulled at said predetermined strength for preventing flopping of the guy line due to the sudden slackness therein so that while applying an increasing load on the second point means, if the first point means does not move prior to said shearing means reaching said predetermined tension and thus shearing, a safe, satisfactory, and reliable anchor is indicated.

7. A testing apparatus as recited in claim 6 wherein,
(a) said spring means comprises a compression spring positioned around said elongated means between a reduced diameter end portion of said housing means outer open end and said head on said elongated means for damping the sudden outward extending movement of said elongated means when the predetermined tension in the guy line is reached resulting in shearing of said shearing means.

8. A testing apparatus as recited in claim 6 wherein,
(a) said housing means has splines formed in the internal surface thereof, and
(b) said head of said elongated means has grooves for sliding on said splines for aligning said headed means with the housing means for insertion of said shearing means.

9. A testing apparatus as recited in claim 6 wherein,
(a) said housing means has stop means for preventing complete separation of said elongated means from within said housing means upon said predetermined tension being reached resulting in shearing of said shearing means.

10. A testing apparatus as recited in claim 6 wherein,
(a) said shearing means is formed of different materials for testing the first point means and the guy line of different pullout loads for shearing at said different loads.

* * * * *